US012300413B2

(12) United States Patent
Marruffo, III et al.

(10) Patent No.: US 12,300,413 B2
(45) Date of Patent: May 13, 2025

(54) THREE-PHASE TOROIDAL TRANSFORMER

(71) Applicant: HUBBELL INCORPORATED, Shelton, CT (US)

(72) Inventors: Salvador Marruffo, III, Mequon, WI (US); Adam Peterson, Wilmot, WI (US); Jean-Yves Schneider, Fox Point, WI (US)

(73) Assignee: Hubbell Incorporated, Shelton, CT (US)

(*) Notice: Subject to any disclaimer, the term of this patent is extended or adjusted under 35 U.S.C. 154(b) by 683 days.

(21) Appl. No.: 16/428,178

(22) Filed: May 31, 2019

(65) Prior Publication Data

US 2019/0371511 A1 Dec. 5, 2019

Related U.S. Application Data

(60) Provisional application No. 62/678,415, filed on May 31, 2018.

(51) Int. Cl.
*H01F 30/12* (2006.01)
*H01F 27/02* (2006.01)
(Continued)

(52) U.S. Cl.
CPC ............ *H01F 27/24* (2013.01); *H01F 27/02* (2013.01); *H01F 27/2823* (2013.01); *H01F 27/32* (2013.01); *H01F 41/06* (2013.01)

(58) Field of Classification Search
CPC .................................................. H01F 27/2823
(Continued)

(56) References Cited

U.S. PATENT DOCUMENTS 8,125,777 B1 * 2/2012 MacLennan ............ H01F 27/10 361/689
8,466,770 B2 * 6/2013 Richardson ............ H01F 38/00 336/229
(Continued)

FOREIGN PATENT DOCUMENTS

CN 101036204 A 9/2007
DE 2 638 561 A1 5/1990
(Continued)

OTHER PUBLICATIONS

English translation of FR2638561 (Year: 1990).*
(Continued)

*Primary Examiner* — Ronald Hinson
(74) *Attorney, Agent, or Firm* — Michael Best & Friedrich LLP

(57) ABSTRACT

A three-phase transformer configured to transform a three-phase voltage. The transformer includes first, second, and third toroidal transformers. The first toroidal transformer is configured to transform a first phase of the three-phase voltage. The second toroidal transformer is electrically connected to the first toroidal transformer. The second toroidal transformer is configured to transform a second phase of the three-phase voltage. The third toroidal transformer is electrically connected to the first toroidal transformer and the second toroidal transformer. The third toroidal transformer is configured to transform a third phase of the three-phase voltage.

8 Claims, 10 Drawing Sheets

(51) Int. Cl.

| | |
|---|---|
| ***H01F 27/24*** | (2006.01) |
| ***H01F 27/28*** | (2006.01) |
| ***H01F 27/32*** | (2006.01) |
| ***H01F 41/06*** | (2016.01) |

(58) Field of Classification Search
USPC .......................................................... 336/229
See application file for complete search history.

(56) References Cited

U.S. PATENT DOCUMENTS

| | | | | |
|---|---|---|---|---|
| 2002/0057164 A1* | 5/2002 | Jin | H01F 38/18 336/115 |
| 2005/0046534 A1* | 3/2005 | Gilmartin | H01F 27/306 336/83 |
| 2006/0125593 A1* | 6/2006 | Piaskowski | H01F 41/0213 336/229 |
| 2008/0000737 A1 | 1/2008 | Hanser | |
| 2008/0007378 A1* | 1/2008 | Hanser | H01F 41/08 29/605 |
| 2008/0136426 A1 | 6/2008 | Fawcett | |
| 2010/0127810 A1 | 5/2010 | Rippel | |

FOREIGN PATENT DOCUMENTS

| | | |
|---|---|---|
| DE | 20 2006 019935 U1 | 6/2007 |
| FR | 2638561 A1 | 5/1990 |
| JP | S61150206 A | 7/1986 |
| JP | H1050534 A | 2/1998 |
| JP | 2013038104 A | 2/2013 |

OTHER PUBLICATIONS

PCT/US2019/034905 International Search Report and Written Opinion dated Oct. 23, 2019.
Extended European Search Report dated Feb. 18, 2022 for corresponding European Application No. 19811298.9.
Second Office Action Issued by the China National Intellectual Property Administration in Chinese Patent Application No. 201980040177.5 dated Jun. 29, 2023 with translation.
Mexican Patent Appl. No. MX/a/2020/012926 Office Action No. 42959 dated May 15, 2024, and translation (12 pages).
Chinese Patent Application No. 201980040177.5 Third Office Action Issued by the China National Intellectual Property Administration dated Mar. 29, 2024, and translation.
Mexican Patent Appl. No. MX/a/2020/012926 Office Action No. 111122 dated Dec. 12, 2023, and translation (8 pages).
19 811 298.9 EPO (European Patent Office) Examination Report dated Jul. 17, 2024.
Anonymous: “Magnet wire—Wikipedia”, Oct. 21, 2016 (Oct. 21, 2016), XP093185117, Retrieved from the Internet: URL:https://en.wikipedia.org/w/index.php?title=Magnet_wire&oldid=745509368.
Mexican Patent Appl. No. MX/a/2020/012926, Third Office Action No. 92236 dated Sep. 25, 2024 (11 pages).

* cited by examiner

THREE-PHASE TOROIDAL TRANSFORMER

RELATED APPLICATIONS

This application claims priority to U.S. Provisional Patent Application No. 62/678,415, filed on May 31, 2018, the entire contents of which are incorporated herein by reference.

FIELD

Embodiments relate to voltage transformers.

SUMMARY

Voltage transformers, such as low voltage transformers, may utilize distributed gap cores, mitered cores, strip steel cores, or stamped lamination cores as the magnetic core construction. However, such core constructions may be relatively large and heavy.

Thus, one embodiment provides a three-phase transformer configured to transform a three-phase voltage. The transformer includes first, second, and third toroidal transformers. The first toroidal transformer is configured to transform a first phase of the three-phase voltage. The second toroidal transformer is electrically connected to the first toroidal transformer. The second toroidal transformer is configured to transform a second phase of the three-phase voltage. The third toroidal transformer is electrically connected to the first toroidal transformer and the second toroidal transformer. The third toroidal transformer is configured to transform a third phase of the three-phase voltage.

Another embodiment provides a method of transforming a three-phase voltage. The method includes transforming, via a first toroidal transformer, a first phase of the three-phase voltage. The method further includes transforming, via a second toroidal transformer electrically connected to the first toroidal transformer, a second phase of the three-phase voltage. The method further includes transforming, via a third toroidal transformer electrically connected to the first toroidal transformer and the second toroidal transformer, a third phase of the three-phase voltage.

Other aspects of the application will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

Figure 1:
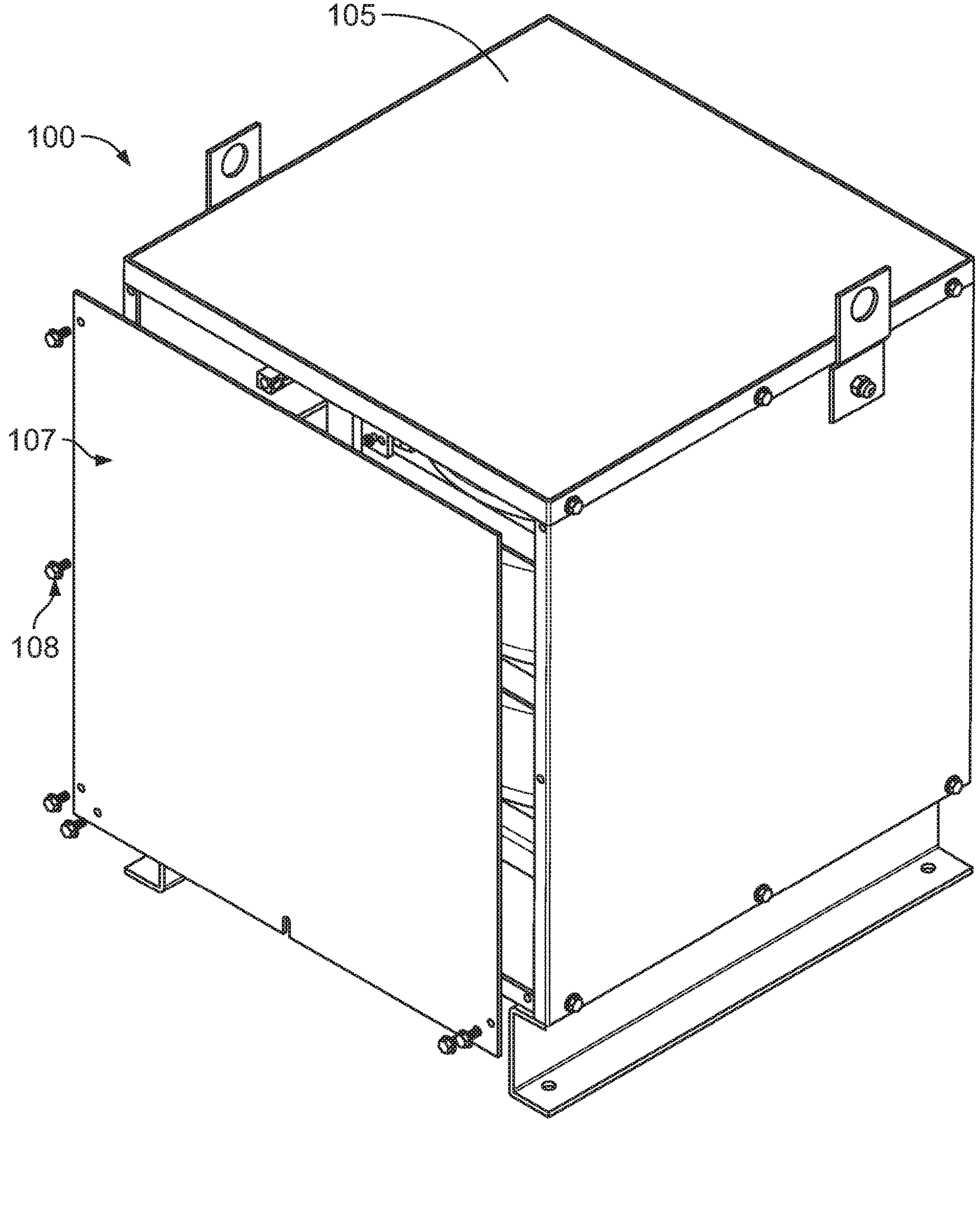
FIG. 1 is a perspective view of a transformer according to some embodiments.
Figure 2:
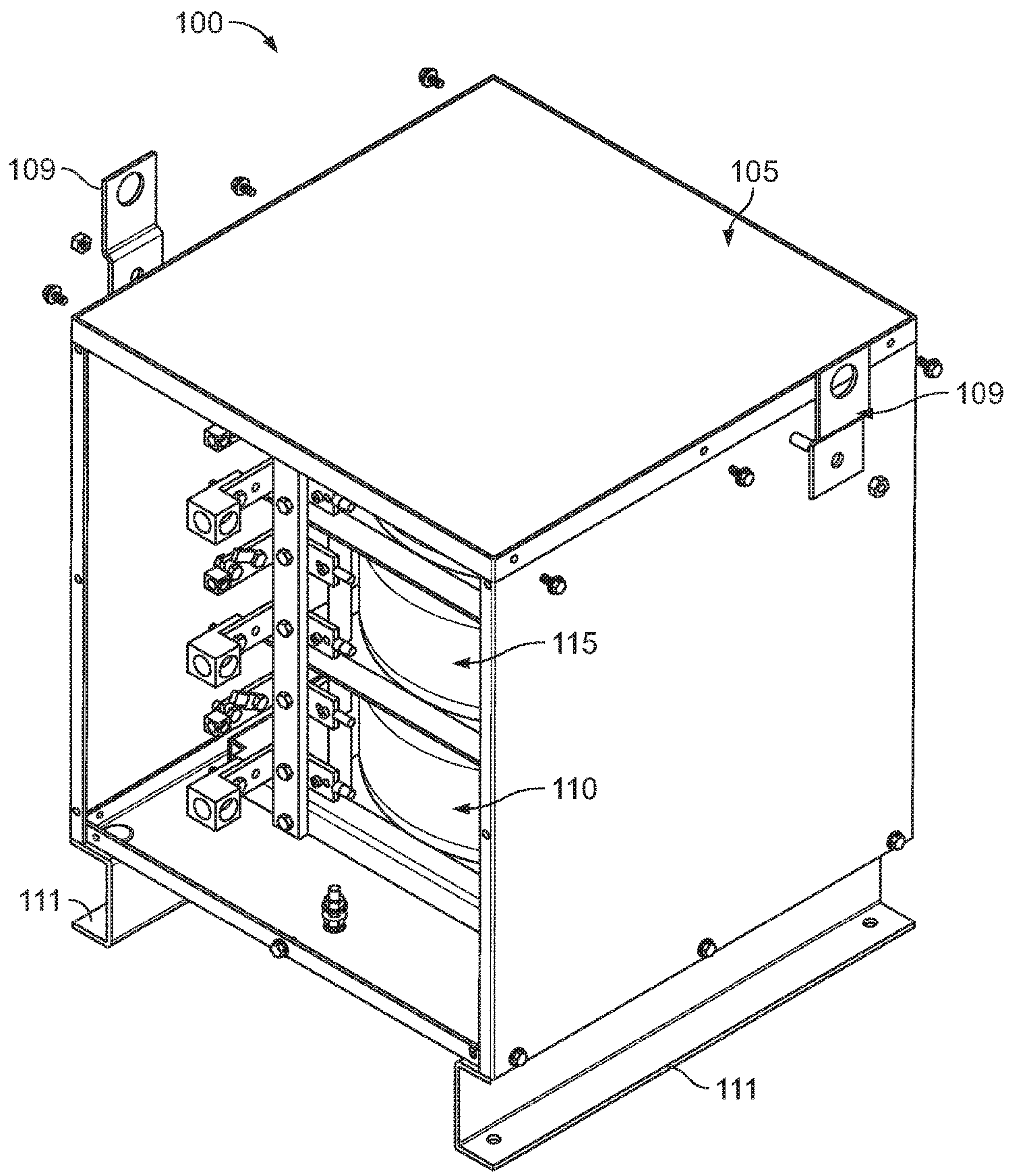
FIG. 2 is a perspective view of the transformer of FIG. 1 with a housing wall removed for illustrative purposes according to some embodiments.
Figure 3:
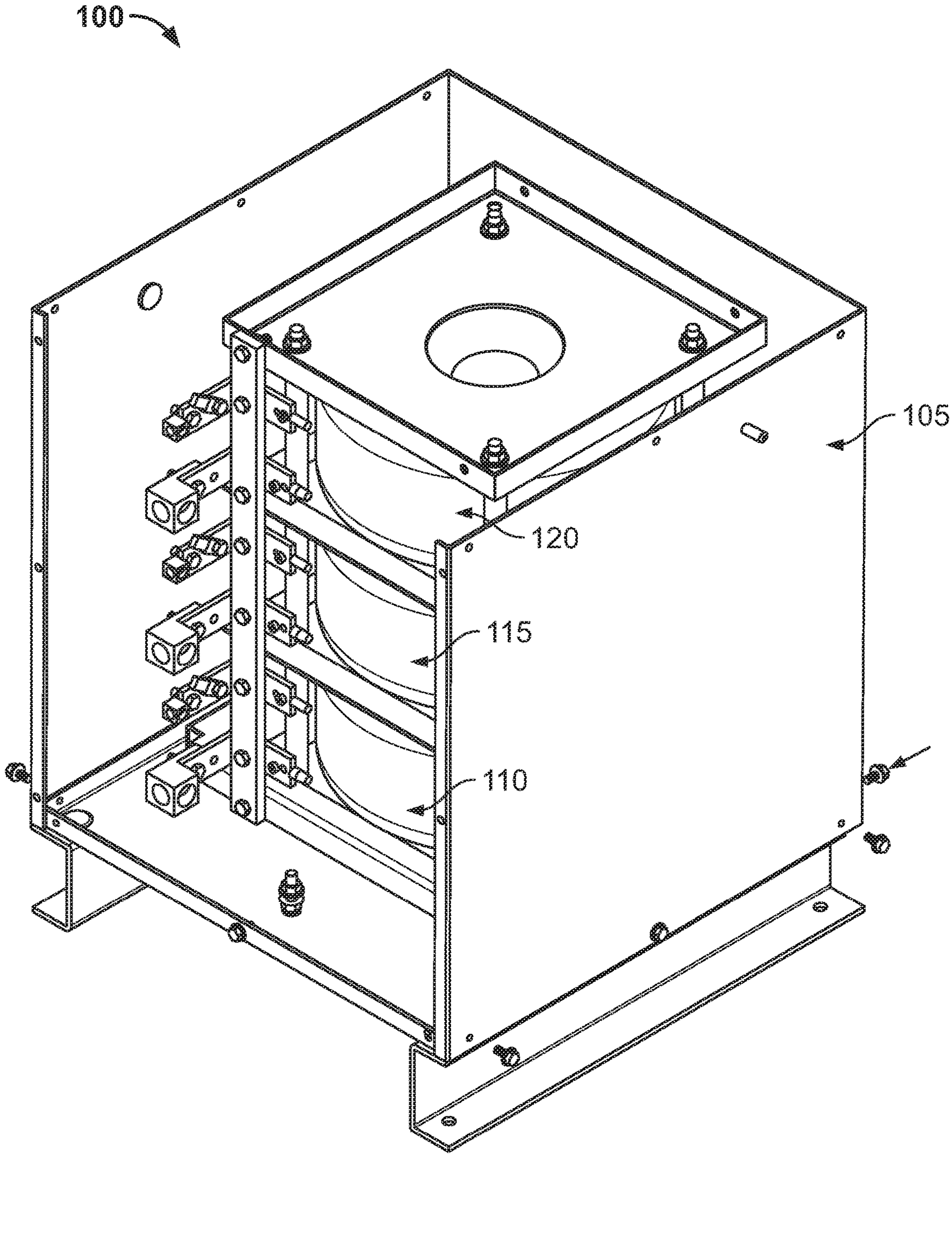
FIG. 3 is a perspective view of the transformer of FIG. 1 with a housing wall and a cover removed for illustrative purposes according to some embodiments.

FIGS. 1-3 are perspective views of a transformer 100 according to some embodiments. Transformer 100 may be configured to transform a three-phase voltage from a first voltage to a second voltage. The transformer 100 includes a housing 105. In some embodiments, the housing 105 is formed of metal, such as but not limited to, sheet metal or a similar material. The housing 105 may include one or more walls 107 connected via one or more fasteners 108. In some embodiments, the housing 105 may be a wall-mounted housing (for example, via mounts 109). In other embodiments, the housing 105 may be a floor-mounted housing (for example, via mounts 111). Enclosed within the housing 105 are a first phase transformer 110, a second phase transformer 115, and a third phase transformer 120. Although illustrated as being placed in a vertical orientation, in other embodiments, the first phase transformer 110, the second phase transformer 115, and the third phase transformer 120 may be placed in a variety of orientations, including but not limited to, a horizontal orientation, a side-by-side orientation, and a staggered orientation.

Figure 4:
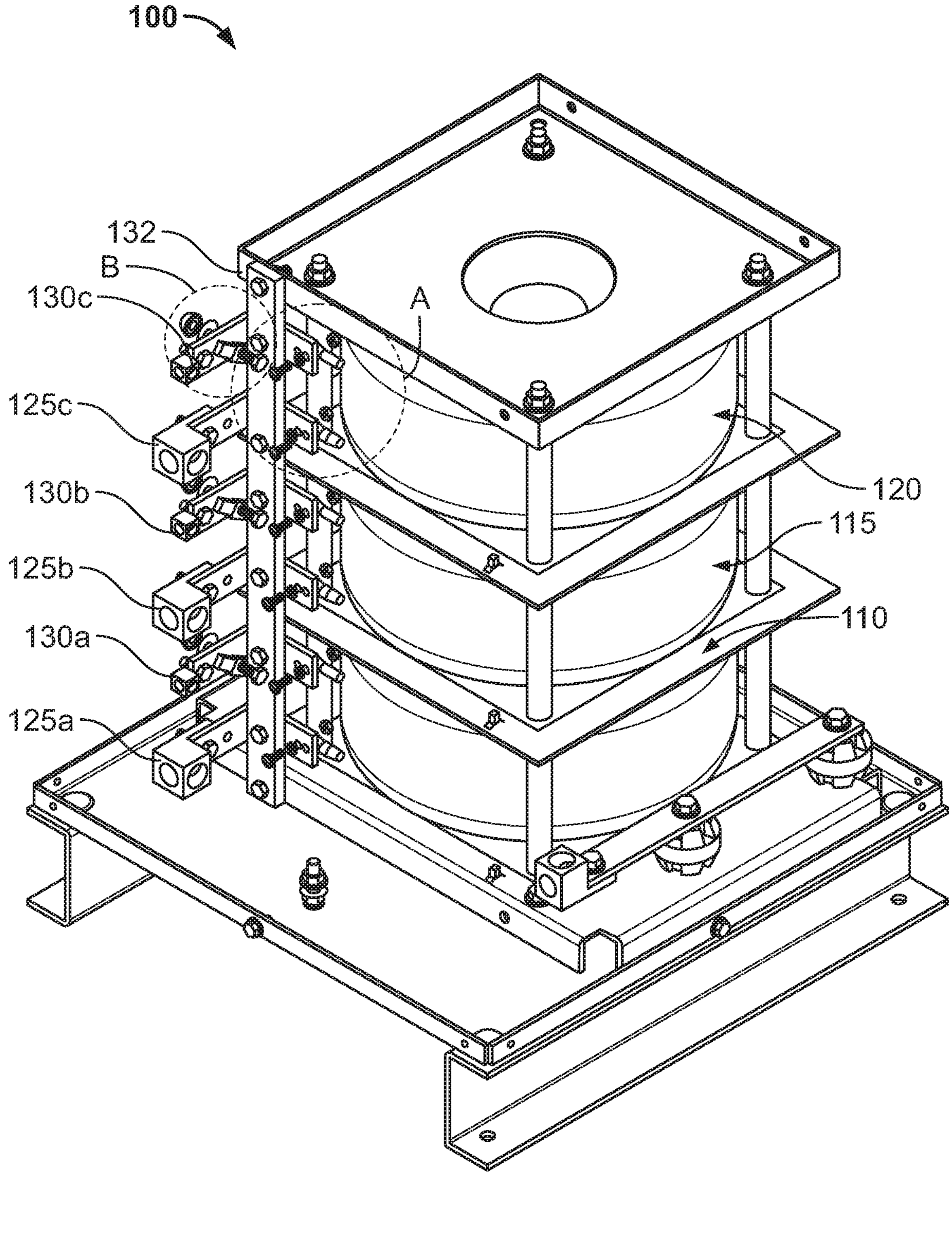
FIG. 4 is a perspective view of the transformer of FIG. 1 with housing walls and a cover removed for illustrative purposes according to some embodiments.
Figure 5:
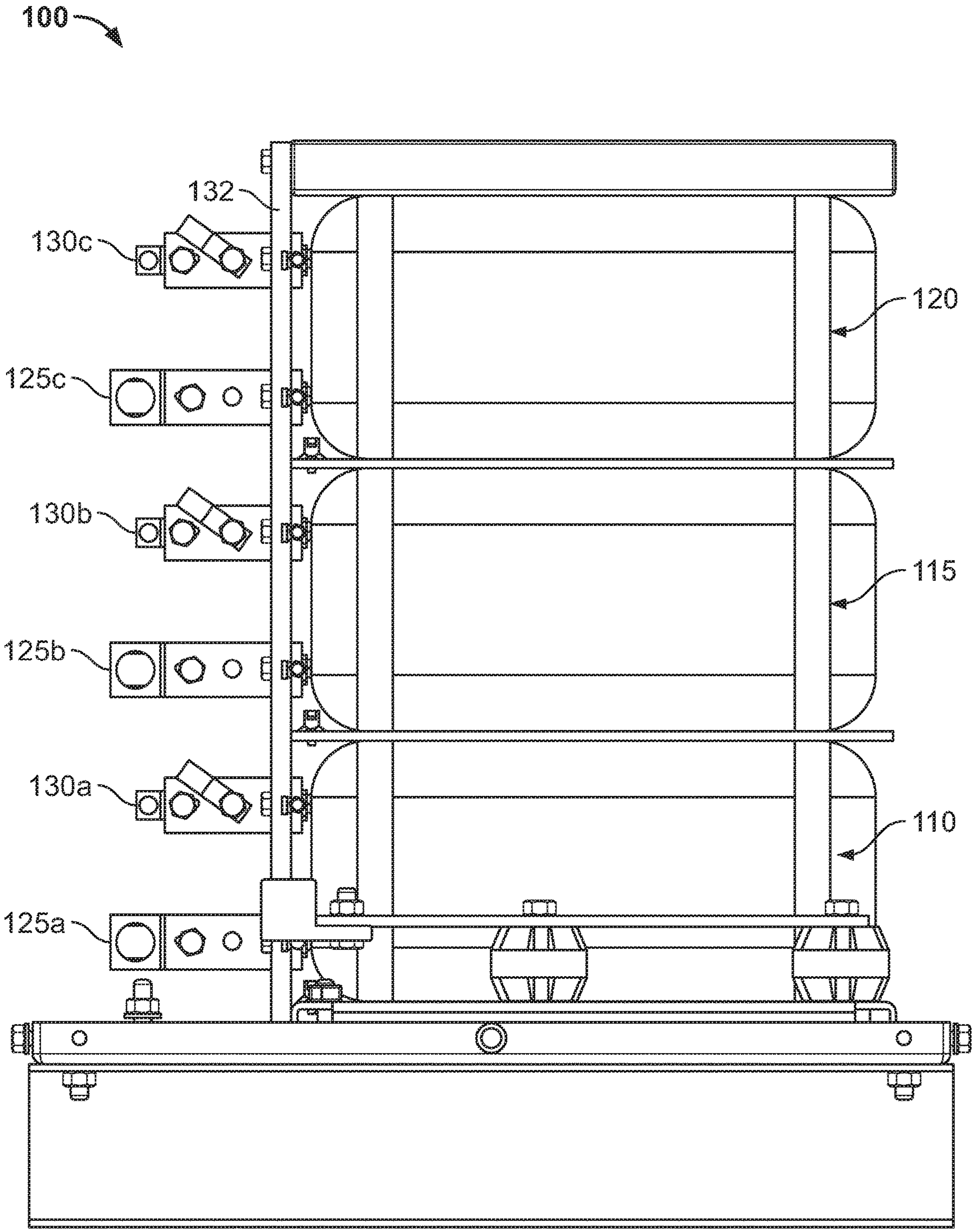
FIG. 5 is a side view of the transformer of FIG. 4 according to some embodiments.

FIGS. 4 and 5 illustrate the first phase transformer 110, the second phase transformer 115, and the third phase transformer 120. As illustrated, in some embodiments, the first phase transformer 110, the second phase transformer 115, and the third phase transformer 120 may be stacked upon each other. Such an embodiment has the benefit of reducing the overall size of the housing 105, and thus the transformer 100.

As illustrated, each transformer 110, 115, 120 includes respective phase inputs 125*a*-125*c* and respective phase outputs 130*a*-130*c*. As illustrated, phase inputs 125*a*-125*c* and phase outputs 130*a*-130*c* may be supported by an input/output support 132. In general operation, the first phase transformer 110 is configured to receive a first phase, via the first phase input 125*a*, of a three-phase voltage at a first voltage and output the first phase, via the first phase output 130*a*, of the three-phase voltage at a second voltage. The second phase transformer 115 is configured to receive a second phase, via the second phase input 125*b*, of the three-phase voltage at the first voltage and output the second phase, via the second phase output 130*b*, of the three-phase voltage at the second voltage. The third phase transformer 120 is configured to receive a third phase, via the third phase input 125*c*, of the three-phase voltage at the first voltage and output the third phase, via the third phase output 130*c*, of the three-phase voltage at the second voltage.

Figure 6:
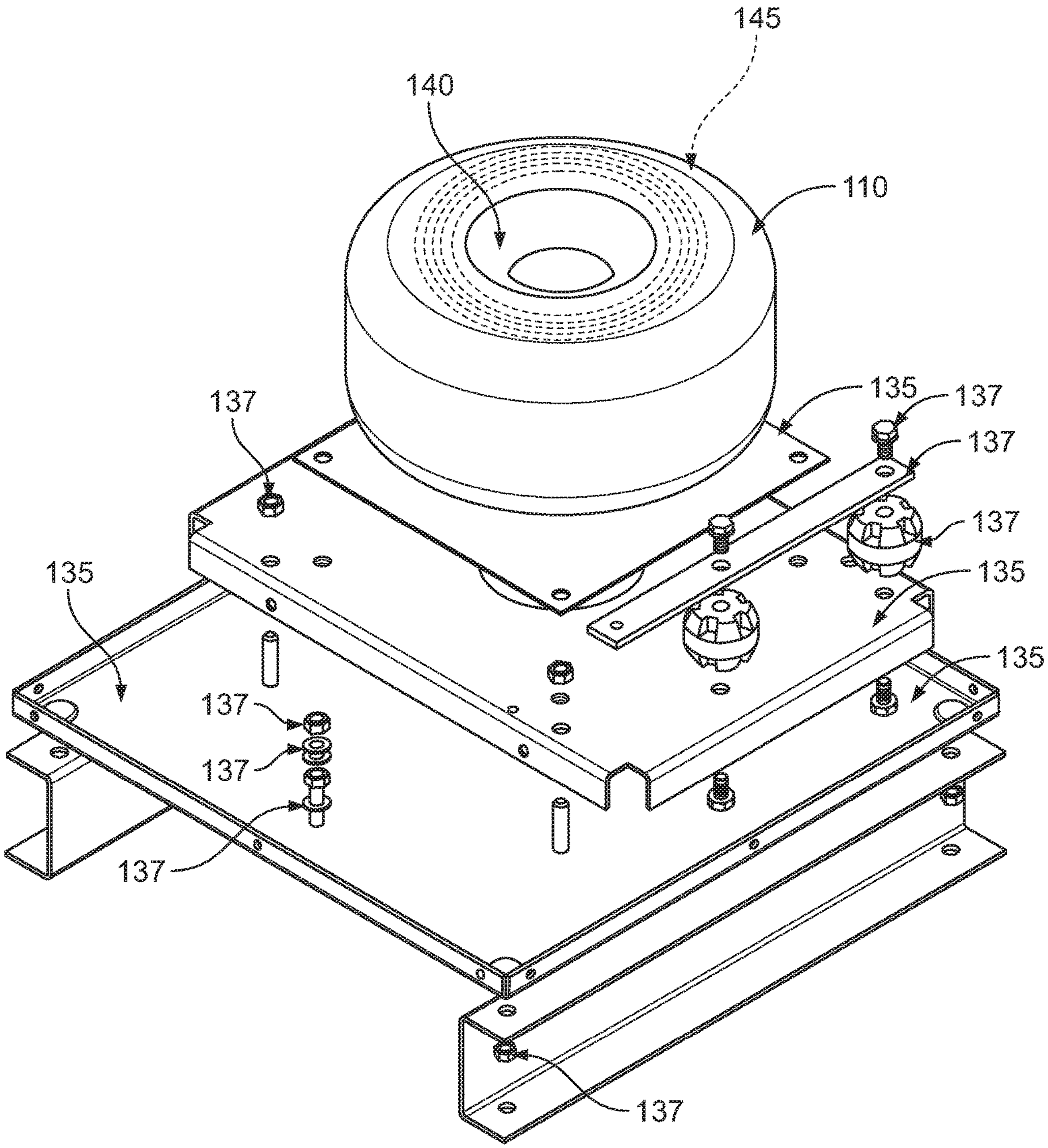
FIG. 6 is a perspective view of a first phase transformer of the transformer of FIG. 1 according to some embodiments.

FIG. 6 illustrates an exploded view of the first phase transformer 110 and a base 135 according to some embodiments. The first phase transformer 110 is supported by the base 135. As illustrated, in some embodiments, the base 135 may be formed of one or more components. In some embodiments, the first phase transformer 110 is supported by the base 135 via one or more fasteners 137. The first phase transformer 110 may include a core 140 and a plurality of windings 145 wound around the core 140. In the illustrated embodiment, the core 140 has a toroidal shape. However, in other embodiments, the core 140 may have other shapes. In some embodiments, the plurality of windings 145 are wrapped magnet wire. In other embodiments, the plurality of windings 145 are film coated magnet wire. In some embodiments, the plurality of windings 145 are formed of aluminum, copper, or a similar material. As discussed above, in operation, the first phase transformer 110 is configured to receive the first phase of the three-phase voltage, and transform the first phase from the first voltage to the second voltage.

Figure 7:
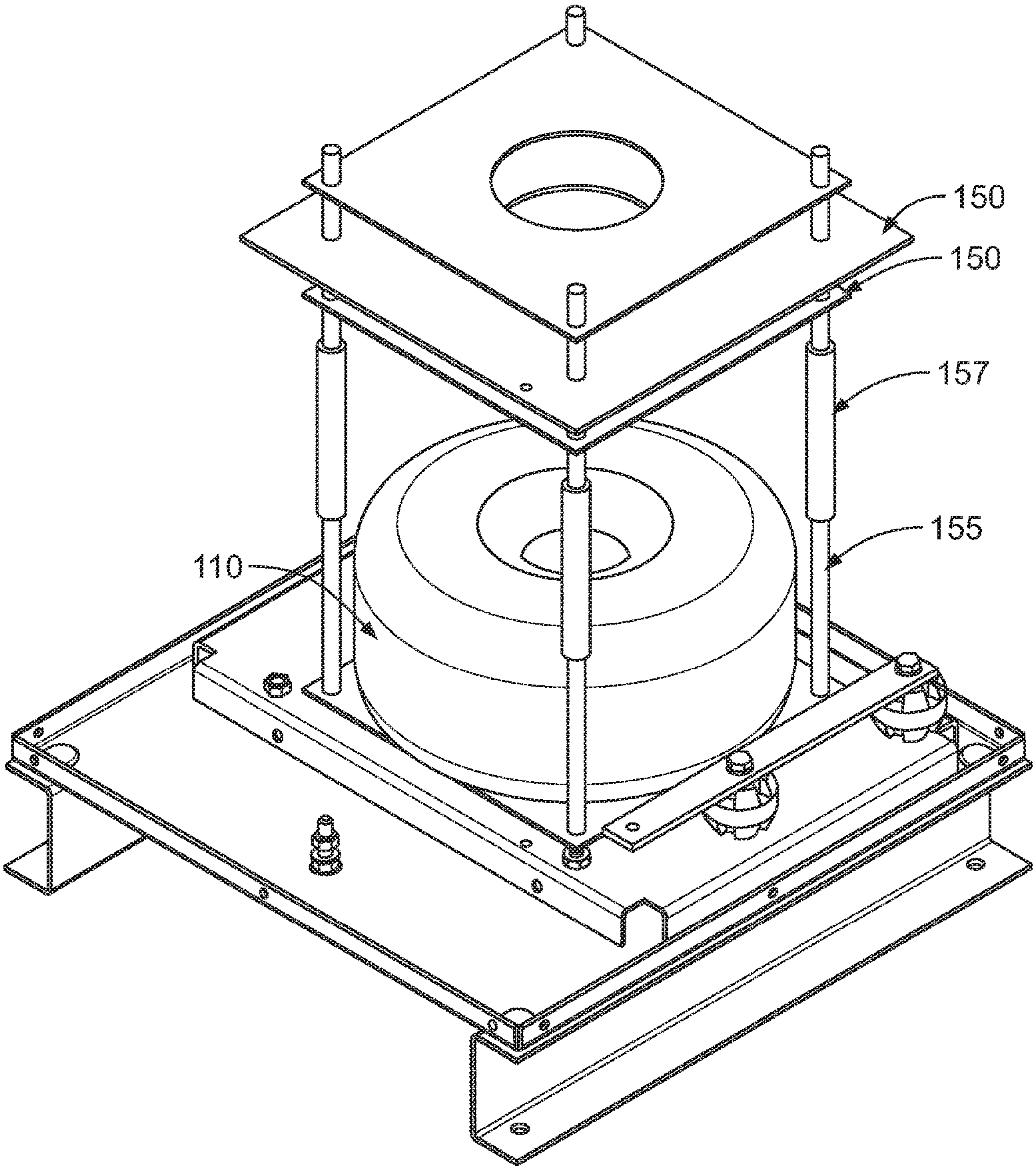
FIG. 7 is a perspective view of a first phase transformer of the transformer of FIG. 1 according to some embodiments.
Figure 8:
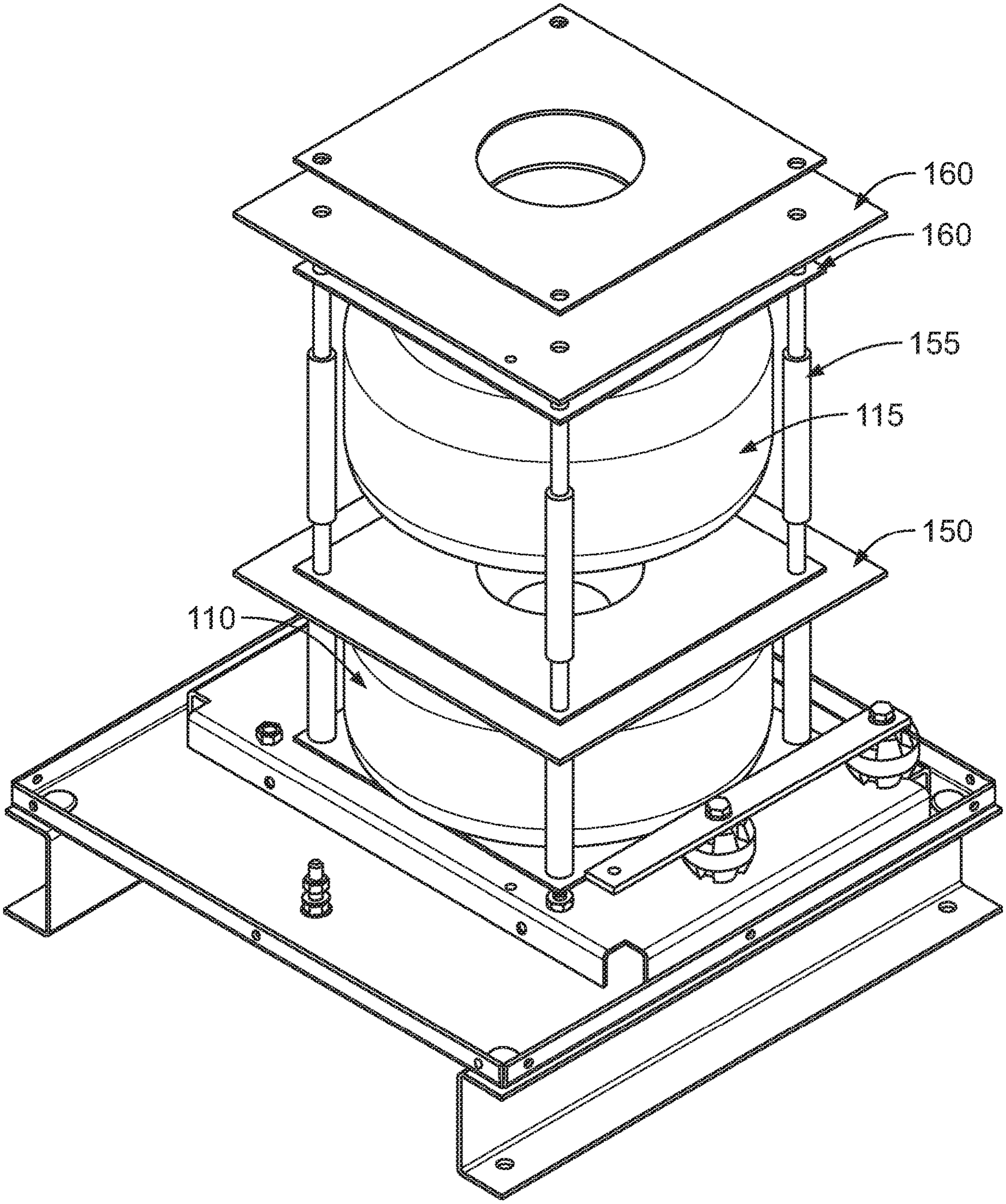
FIG. 8 is a perspective view of a first phase transformer and a second phase transformer of the transformer of FIG. 1 according to some embodiments.

FIG. 7 illustrates an exploded view of the transformer 100 including the first phase transformer 110 according to some embodiments. As illustrated, a second base, or platform, 150 may be placed above the first phase transformer 110. As illustrated, in some embodiments, the second base 150 may be formed of one or more components. The second base 150 may be supported by one or more supports 155. As illustrated in FIG. 8, the second phase transformer 115 may then be located on the second base 150, such that the second phase transformer 115 is stacked upon the first phase transformer 110. The second phase transformer 115 may have a similar construction as the first phase transformer 110. For example, the second phase transformer 115 may a core 140 and a plurality of windings 145 wound around the core 140. As discussed above, in operation, the second phase transformer 115 is configured to receive the second phase of the three-phase voltage, and transform the second phase from the first voltage to the second voltage.

Figure 9:
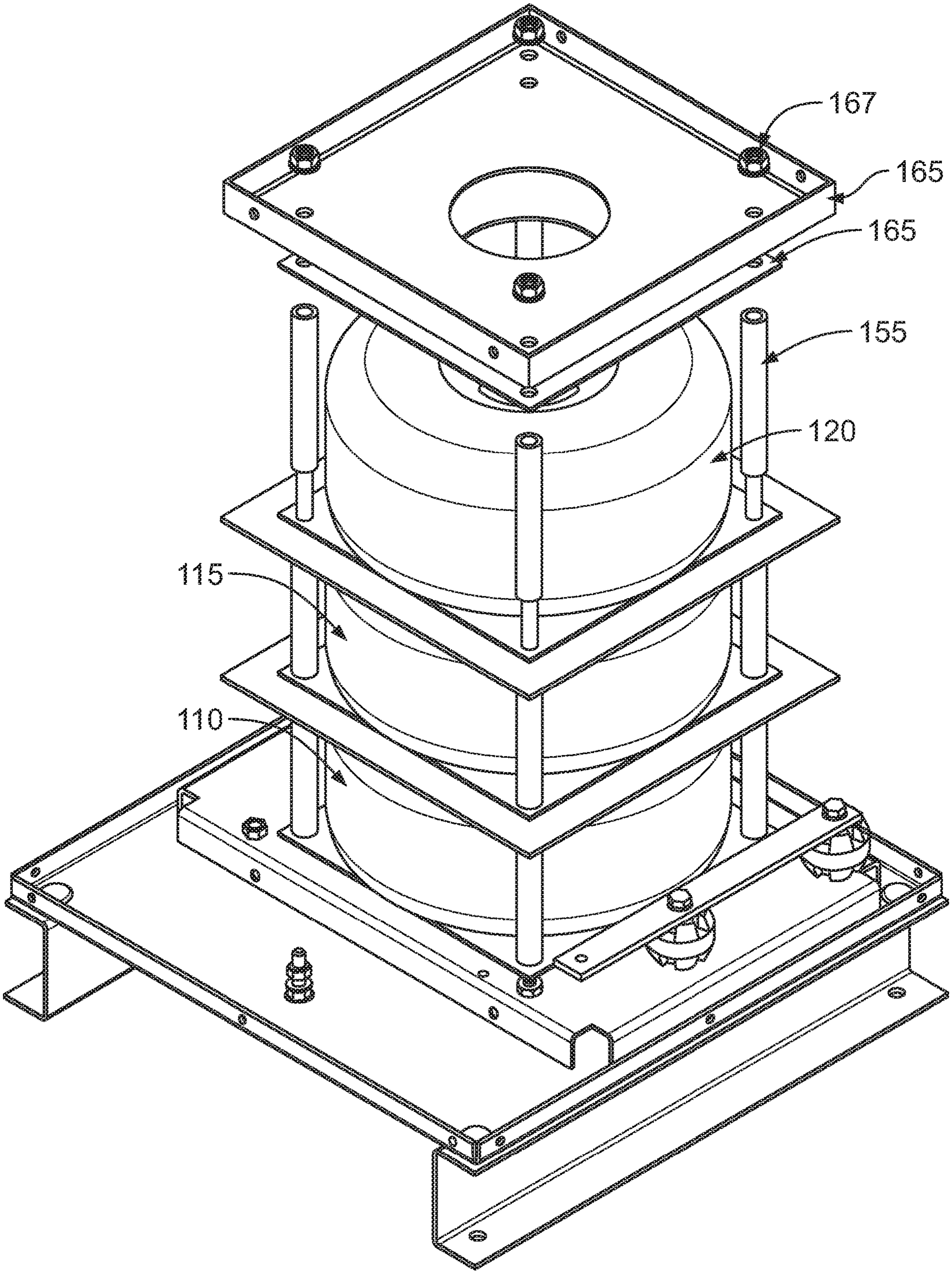
FIG. 9 is a perspective view of a first phase transformer, a second phase transformer, and a third phase transformer of the transformer of FIG. 1 according to some embodiments.

As further illustrated in FIG. 8, a third base, or platform, 160 may be placed above the second phase transformer 115. The third base 160 may also be supported by one or more supports 155. As illustrated in FIG. 9, the third phase transformer 120 may then be located on the third base 160, such that the third phase transformer 120 is stacked upon the second phase transformer 115 and the first phase transformer 110. As further illustrated in FIG. 9, a top, or cap, 165 may then be placed above the third phase transformer 120. As illustrated, in some embodiments, the cap 165 may be formed of one or more components. The cap 165 may be secured to the one or more supports 155 via one or more fasteners 167. As discussed above, in operation, the third phase transformer 120 is configured to receive the third phase of the three-phase voltage, and transform the third phase from the first voltage to the second voltage.

Figure 10:
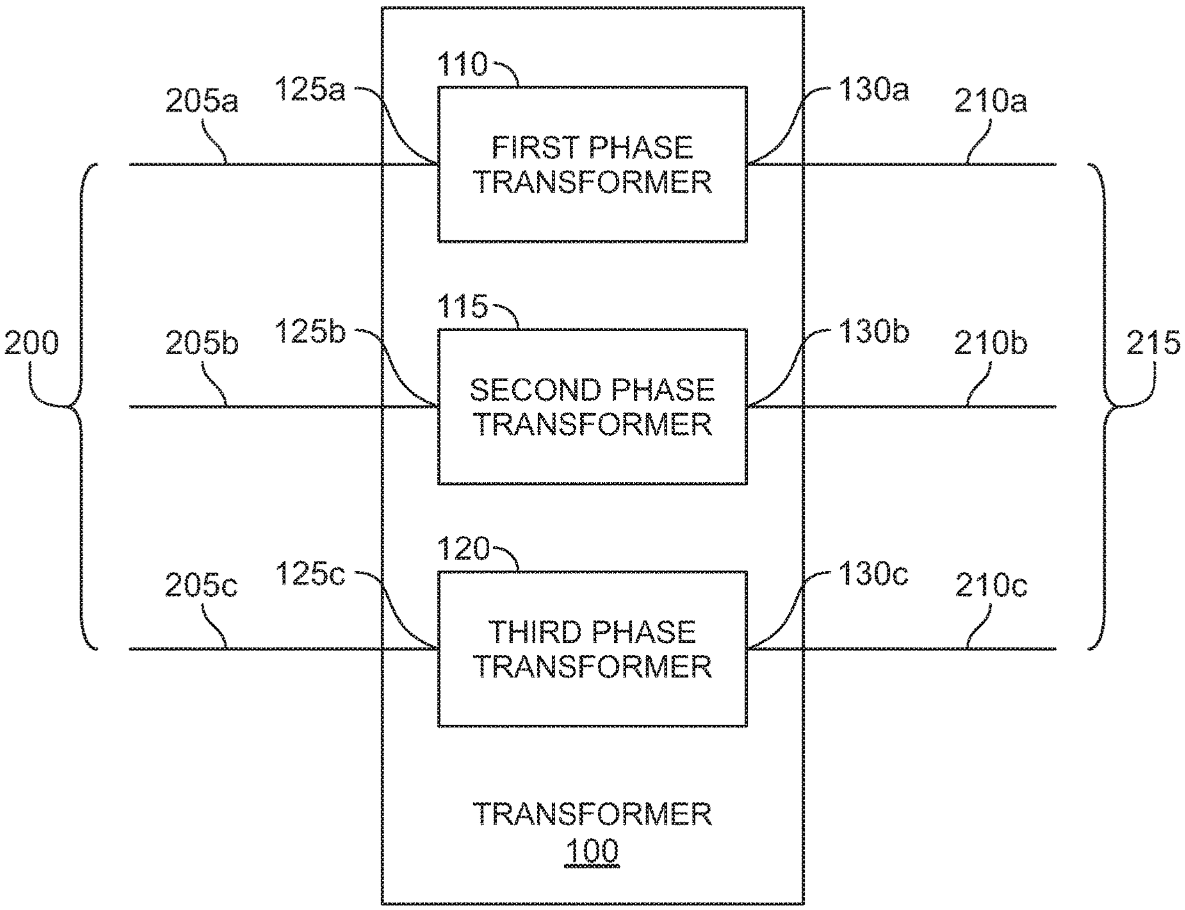
FIG. 10 is a block diagram of the transformer of FIG. 1 according to some embodiments.

FIG. 10 is a block diagram illustrating the transformer 100 according to some embodiments. The transformer 100 is configured to receive an input three-phase voltage 200 having a first phase 205*a*, a second phase 205*b*, and a third phase 205*c*, at a first voltage level. The first phase 205*a*, at the first voltage level, is received by the first phase input 125*a* of the first phase transformer 110. The second phase 205*b*, at the first voltage level, is received by the second phase input 125*b* of the second phase transformer 115. The third phase 205*c*, at the first voltage, is received by the third phase input 125*c* of the third phase transformer 120. The first, second, and third phase transformers 110, 115, 120 transform each respective phase 205*a*-205*c* of the three-phase voltage 200 from the first voltage level to the second voltage level.

The transformed first phase 210*a*, at the second voltage level, is then output from the first phase output 130*a* of the first phase transformer 110. The transformed second phase 210*b*, at the second voltage level, is then output from the second phase output 130*b* of the second phase transformer 115. The transformed third phase 210*c*, at the second voltage level, is then output from the third phase output 130*c* of the third phase transformer 120. The transformer 100 outputs transformed three-phase voltage 215 having the transformed first, second, and first phases 210*a*-210*c*, at the second voltage.

Figure 11:
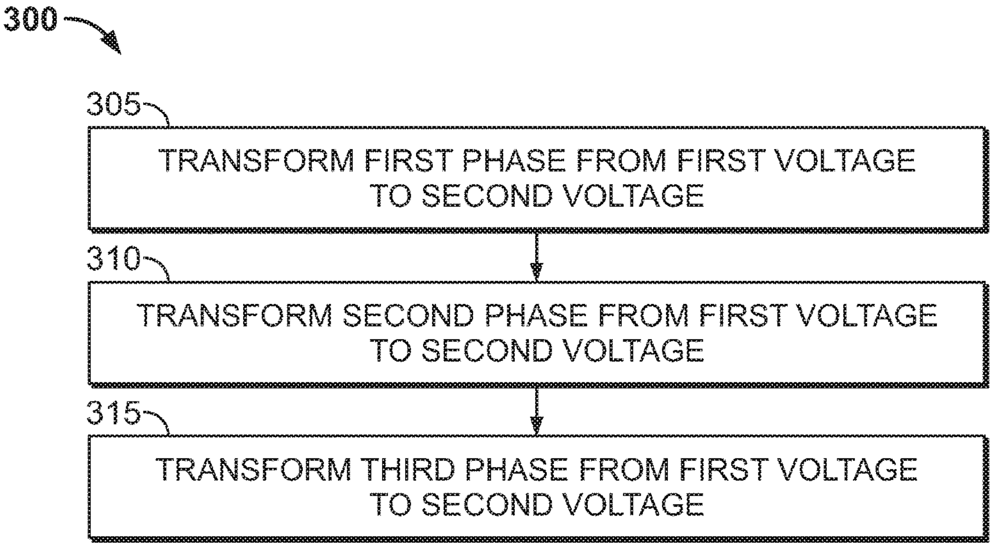
FIG. 11 is flowchart illustrating an operation, or method, of the transformer of FIG. 1 according to some embodiments.

FIG. 11 is a flowchart illustrating a process, or operation, 300 according to some embodiments. It should be understood that the order of the steps disclosed in operation 300 could vary. Although illustrated as occurring in parallel order, in other embodiments, the steps disclosed may be performed in serial order. Furthermore, additional steps may be added to the process and not all of the steps may be required. A first phase of a three-phase voltage is transformed, via a first phase transformer, from a first voltage to a second voltage (block 305). A second phase of the three-phase voltage is transformed, via a second phase transformer, from the first voltage to the second voltage (block 310). A third phase of the three-phase voltage is transformed, via a third phase transformer, from the first voltage to the second voltage (block 315).

Thus, the application provides, among other things, a three-phase voltage transformer. The three-phase voltage transformer meets Department of Energy and UL requirements while providing a relatively small and light transformer that may be mountable on a wall or a floor. Various features and advantages of the application are set forth in the following claims.

What is claimed is:

1. A three-phase transformer configured to transform a three-phase voltage, the transformer comprising:

a first toroidal transformer configured to transform a first phase of the three-phase voltage, the first toroidal transformer including a first toroidal core wound with a first film coated magnet wire, wherein the first toroidal transformer is supported by a first base via one or more fasteners;

a second toroidal transformer electrically connected to the first toroidal transformer, the second toroidal transformer configured to transform a second phase of the three-phase voltage, the second toroidal transformer including a second toroidal core wound with a second film coated magnet wire, wherein the second toroidal transformer is supported by a second base, and wherein the second base is supported by one or more first supports connected to the first base;

a third toroidal transformer electrically connected to the first toroidal transformer and the second toroidal transformer, the third toroidal transformer configured to transform a third phase of the three-phase voltage, the third toroidal transformer including a third toroidal core wound with a third film coated magnet wire, wherein the third toroidal transformer is supported by a third base, and wherein the third base is supported by one or more second supports connected to the second base; and an input/output support that is linearly arranged along an axial direction of the first toroidal transformer, the second toroidal transformer, and the third toroidal transformer, wherein the input/output support is configured to support a first phase input and a first phase output of the first toroidal transformer, a second phase input and a second phase output of the second toroidal transformer, and a third phase input and a third phase output of the third toroidal transformer; and wherein the input/output support contacts the first base, the second base, and the third base.

2. The three-phase transformer of claim 1, wherein the magnetic wire is at least one selected from a group consisting of aluminum and copper.

3. The three-phase transformer of claim 1, wherein the magnetic wire is at least one selected from a group consisting of aluminum and copper.

4. The three-phase transformer of claim 1, wherein the magnetic wire is at least one selected from a group consisting of aluminum and copper.

5. The three-phase transformer of claim 1, wherein the first toroidal transformer, the second toroidal transformer, and the third toroidal transformer are enclosed within a single housing.

6. A method of transforming a three-phase voltage, the method comprising:

transforming, via a first toroidal transformer, a first phase of the three-phase voltage, the first toroidal transformer including a first toroidal core wound with a first film coated magnet wire, wherein the first toroidal transformer is supported by a first base via one or more fasteners;

transforming, via a second toroidal transformer electrically connected to the first toroidal transformer, a second phase of the three-phase voltage, the second toroidal transformer including a second toroidal core wound with a second film coated magnet wire, wherein the second toroidal transformer is supported by a second base, and wherein the second base is supported by one or more first supports connected to the first base; and transforming, via a third toroidal transformer electrically connected to the first toroidal transformer and the second toroidal transformer, a third phase of the three-phase voltage, the third toroidal transformer including a third toroidal core wound with a third film coated magnet wire, wherein the third toroidal transformer is supported by a third base, and wherein the third base is supported by one or more second supports connected to the second base; and wherein an input/output support is linearly arranged along an axial direction of the first toroidal transformer, the second toroidal transformer, and the third toroidal transformer, wherein the input/output support is configured to support a first phase input and a first phase output of the first toroidal transformer, a second phase input and a second phase output of the second toroidal transformer, and a third phase input and a third phase output of the third toroidal transformer;

and wherein the input/output support contacts the first base, the second base, and the third base.

7. The method of claim 6, wherein the magnetic wire is at least one selected from a group consisting of aluminum and copper.

8. The method of claim 6, further comprising:

enclosing the first toroidal transformer, the second toroidal transformer, and the third toroidal transformer in a single housing.

* * * * *